(12) United States Patent
Wagner

(10) Patent No.: US 8,002,287 B2
(45) Date of Patent: Aug. 23, 2011

(54) HAND ASSEMBLABLE FUEL INJECTOR SEAL

(75) Inventor: John B. Wagner, Greenfield, IN (US)

(73) Assignee: Freudenberg-NOK General Partnership, Plymouth, MI (US)

(*) Notice: Subject to any disclaimer, the term of this patent is extended or adjusted under 35 U.S.C. 154(b) by 532 days.

(21) Appl. No.: 11/780,228

(22) Filed: Jul. 19, 2007

(65) Prior Publication Data

US 2008/0012234 A1 Jan. 17, 2008

Related U.S. Application Data

(63) Continuation-in-part of application No. 11/049,494, filed on Feb. 2, 2005, now abandoned, application No. 11/780,228, which is a continuation-in-part of application No. 11/687,928, filed on Mar. 19, 2007, now Pat. No. 7,798,497.

(60) Provisional application No. 60/542,995, filed on Feb. 9, 2004.

(51) Int. Cl.
*F16J 15/32* (2006.01)
(52) U.S. Cl. ........................................ 277/551; 277/573
(58) Field of Classification Search .................... 277/573
See application file for complete search history.

(56) References Cited

U.S. PATENT DOCUMENTS

| | | | |
|---|---|---|---|
| 4,298,206 A | 11/1981 | Kojima et al. | |
| 4,530,506 A * | 7/1985 | Weiler et al. | 277/636 |
| 4,565,380 A | 1/1986 | Newman et al. | |
| 4,874,261 A * | 10/1989 | Colanzi et al. | 277/574 |
| 5,310,408 A | 5/1994 | Schryver et al. | |
| 5,649,709 A | 7/1997 | Munekata et al. | |
| 5,730,444 A | 3/1998 | Notter | |
| 6,994,354 B2 | 2/2006 | Sakata | |
| 2002/0149154 A1 | 10/2002 | Oldenburg | |
| 2003/0160397 A1 | 8/2003 | Sakata | |
| 2005/0173869 A1 | 8/2005 | Wagner | |

* cited by examiner

*Primary Examiner* — Shane Bomar
*Assistant Examiner* — Gilbert Y Lee
(74) *Attorney, Agent, or Firm* — Ronald W. Wangerow, Esq.; Harness, Dickey & Pierce, P.L.C.

(57) ABSTRACT

A seal adapted to sealingly engage an outer member and an inner member in an installed position includes a first portion, a second portion and an intermediate portion. The first portion is adapted to sealingly engage a sealing surface of the outer member in the installed position. The second portion is adapted to sealingly engage the inner member in the installed position. The intermediate portion extends between the first and second portions. The first portion includes an outboard surface engaging the sealing surface of the outer member and a first overlap portion extending outwardly beyond an inner diameter of the sealing surface.

20 Claims, 10 Drawing Sheets

HAND ASSEMBLABLE FUEL INJECTOR SEAL

CROSS-REFERENCE TO RELATED APPLICATIONS

This application is a continuation-in-part of U.S. patent application Ser. No. 11/049,494 filed on Feb. 2, 2005 (now abandoned), which claims the benefit of U.S. Provisional Application No. 60/542,995 filed on Feb. 9, 2004. This application is a continuation-in-part of U.S. patent application Ser. No. 11/687,928 filed on Mar. 19, 2007 (now U.S. Pat. No. 7,798,497). The disclosures of the above applications are incorporated herein by reference.

FIELD OF THE INVENTION

The present disclosure relates to seals and more particularly to a hand assemblable fuel injector seal.

BACKGROUND OF THE INVENTION

Seals are commonly used for sealing a gap disposed around an outer surface of an inner member received within a bore of an outer member, such as a fuel injector or a spark plug. Typically, the gap is sized so as to fully accommodate the seal member radially between the outer surface of the inner member and the inner surface of the bore.

Conventional spark plug tube seals and fuel injector seals incorporate a rubber outer dimension (OD) for engaging a bore and may have various inner dimension (ID) seal configurations for engaging a shaft.

SUMMARY OF THE INVENTION

A seal adapted to sealingly engage an outer member and an inner member in an installed position includes a first portion, a second portion and a flexible intermediate portion. The first portion is adapted to sealingly engage a sealing surface of the outer member in the installed position. The second portion is adapted to sealingly engage the inner member in the installed position. The flexible intermediate portion extends between the first and second portions. The first portion includes an outboard surface engaging the sealing surface of the outer member and a first overlap portion extending outwardly beyond an inner diameter of the sealing surface.

According to additional features a first annular ring is disposed in the first portion. A second annular ring is disposed in the second portion. The annular rings comprise a rigid material such as metal. The first portion of the seal can define a second overlap portion extending outwardly beyond the inner diameter of the sealing surface. The first and second overlap portions overlap opposite ends of the sealing surface.

Further areas of applicability of the present disclosure will become apparent from the detailed description provided hereinafter. It should be understood that the detailed description and specific examples, while indicating an embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description of the embodiment(s) is merely exemplary in nature and is in no way intended to limit the disclosure, its application, or uses.

Figure 1:
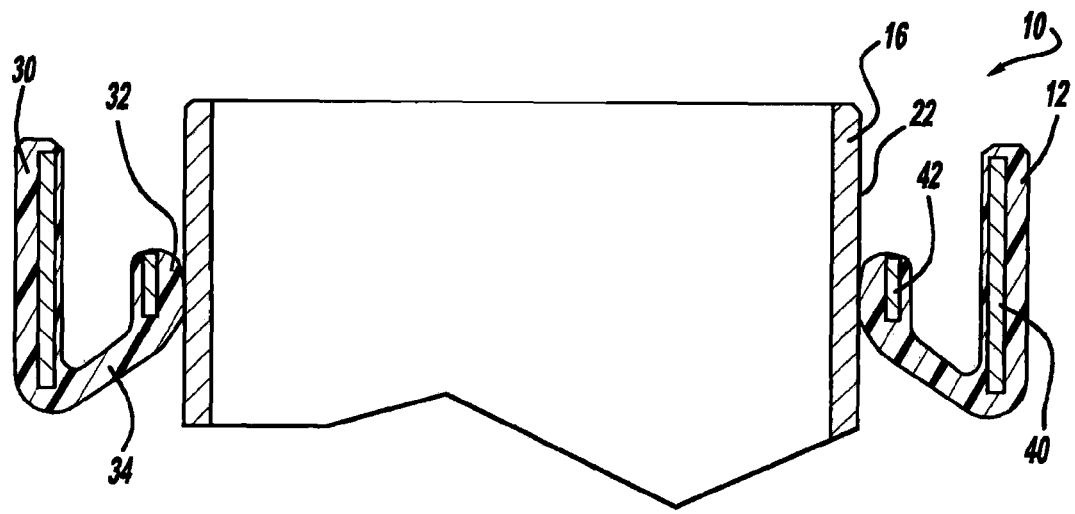
FIG. 1 is a sectional view of a seal according to the present teachings and shown engaged to an inner shaft.
Figure 2:
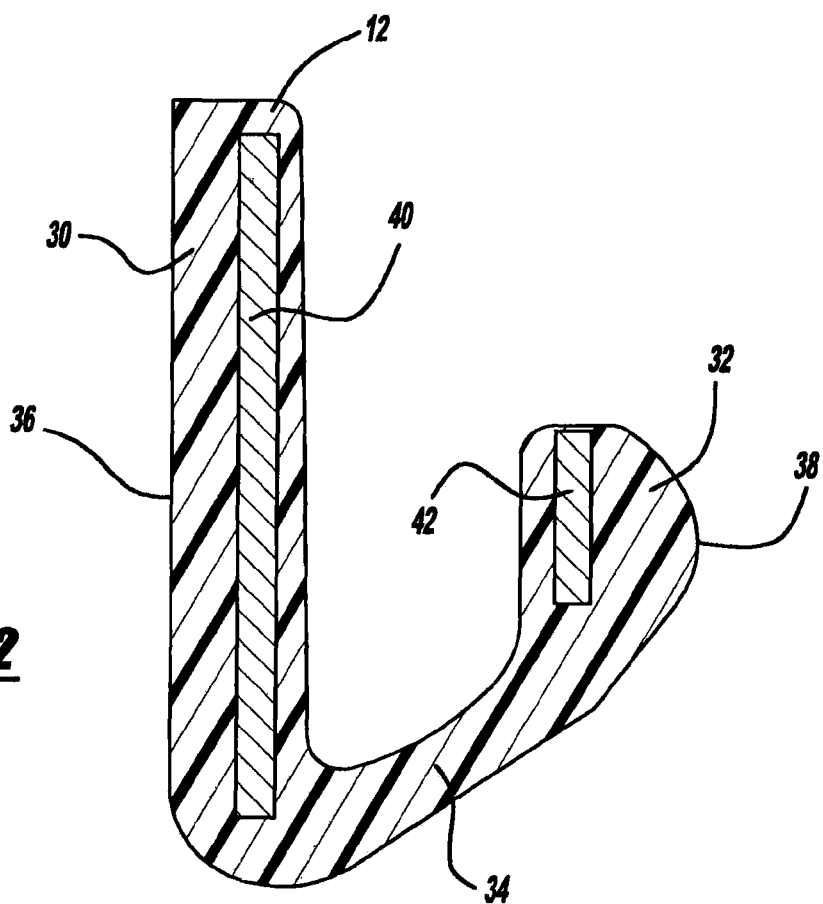
FIG. 2 is a detailed sectional view of a portion of the seal illustrated in FIG. 1.
Figure 2A:
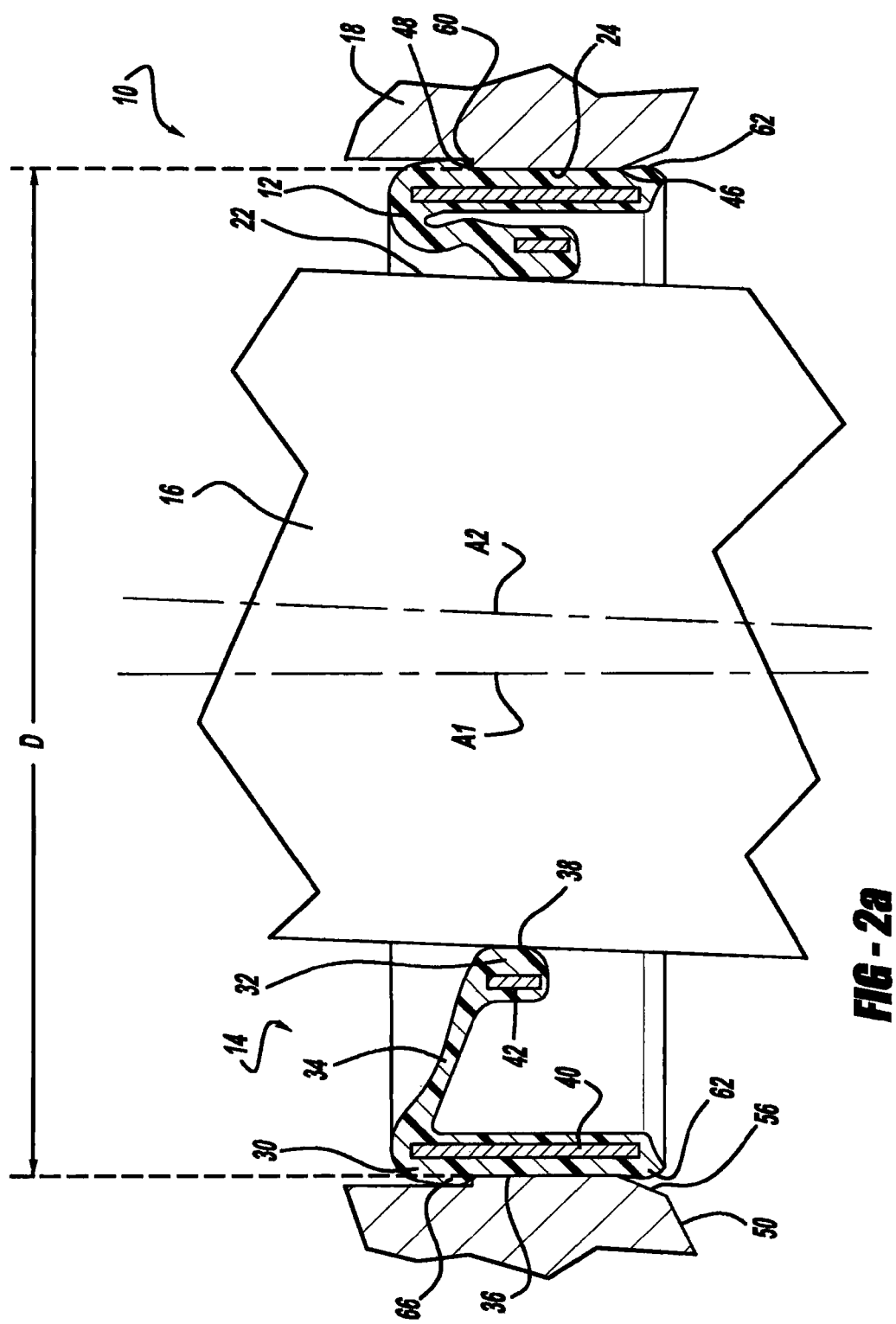
FIG. 2a is a sectional view of the seal of FIG. 1 shown in an installed position sealingly engaged to the inner shaft and an outer member.

With initial reference to FIGS. 1-2a an arrangement for sealing an annular space is shown and generally identified at reference numeral 10. The arrangement 10 generally includes a seal 12 disposed in an annular space 14 (FIG. 2a) defined between an inner member 16 and an outer member 18. During operation, the seal 12 engages respective sealing surfaces 22 and 24 on the inner and outer members 16 and 18, respectively in an installed position (FIG. 2a). For purposes of discussion the inner member 16 will be referred to herein as a shaft while the outer member 18 will be referred to herein as a bore. It is appreciated that while the specific examples provided herein relate to a spark plug tube seal arrangement having a shaft and a bore, the teachings may be similarly applicable to other sealing arrangements and are not limited to a spark plug tube seal.

With specific reference now to FIGS. 1 and 2, the seal 12 will be described in greater detail. In general, the seal 12 includes a first portion 30, a second portion 32 and an intermediate portion 34 extending between the first portion 30 and the second portion 32. The first portion 30 is radially offset outwardly relative to the second portion 32. The first portion 30 defines an outboard sealing surface 36 for engaging the sealing surface 24 of the bore 18 (FIG. 2a) in an installed position. Similarly, the second portion 32 defines an inboard sealing surface 38 for engaging the sealing surface 22 of the shaft 16 in an installed position. The intermediate portion 34 generally defines a conical contour. The outboard and inboard sealing surfaces 36 and 38 of the seal 12 may be made of an elastomeric material such as rubber although other materials may be used.

The outboard sealing surface 36 of the seal 12 generally defines a cylindrical face. The inboard sealing surface 38 of the seal 12 generally defines an arcuate contour. As will be described in greater detail herein, the second portion 32 is adapted to deflect with the inner member 16 (FIG. 2a) and maintain contact with the inner member 16 upon movement of the inner member 16 relative the outer member 18.

The first portion 30 of the seal 12 includes a first annular ring 40 disposed therein. The second portion 32 of the seal 12 includes a second annular ring 42 disposed therein. The annular rings 40 and 42 may be made of a rigid material such as metal. The annular rings 40 and 42 provide rigidity to the respective first and second portions 30 and 32 and to the seal 12 as a whole.

With specific reference now to FIG. 2a the seal 12 and its interaction with the bore 18 in an installed position will be described. The seal 12 provides barb-like retention properties at an interface with the bore 18 to resist axial movement of the seal 12 relative to the bore 18. The bore 18 interfaces the first portion 30 of the seal 12 at the outboard sealing surface 36. The bore 18 defines a first radial edge 46 at an installation end 50 and a second radial edge 48 at an opposite end. At the installation end 50 of the bore 18, the first radial edge 46 leads to a chamfer 56 for facilitating installation of the seal 12 relative the bore 18 in a direction upward as viewed from FIG. 2a. The chamfer 56 guides the seal 12 into the annular space 14 during installation. On the opposite end of the bore 18 the second radial edge 48 leads to a transverse lip 60.

As shown in FIG. 2a, the seal 12 defines a first overlap portion 62 extending outwardly at the first radial edge 46 beyond an inner diameter D defined by the sealing surface 24 of the bore 18 in the installed position. Similarly, a second overlap portion 66 extends outwardly at the second radial edge 48 beyond the inner diameter D of the sealing surface 24 of the bore 18. The overlap portions 62 and 66 resist axial movement of the seal 12 along an axis of the bore 18 in the installed position. The first and second radial edge 46 and 48 provide the barb-like retention properties onto the outboard sealing surface 36 of the seal 12. As a result, the seal 12 maintains the installed position over time. It is appreciated that the chamfer 56 and the transverse lip 60 may comprise other geometries while allowing the seal 12 to overlap beyond the inner diameter of the sealing surface 24 of the bore 18.

With continued reference to FIG. 2a, the seal 12 accommodates lateral and angular movement of the shaft 16 relative to an axis of the bore 18 while maintaining a seal at an interface between the inboard sealing surface 38 of the seal 12 and the sealing surface 22 of the shaft 16. In FIG. 2a the shaft 16 is shown moved from an axis A1 laterally rightward and rotated in the clockwise direction to an axis A2. The second portion 32 of the seal 12 moves complementary to movement of the shaft 16. To maintain an interface between the seal 12 and the shaft 16, the intermediate portion 34 stretches on a first portion and buckles on an opposite portion. It is appreciated that the intermediate portion 34 may comprise a greater slope between the first portion 30 and the second portion 32 to accommodate further deflection and/or rotation of the shaft 16. While the seal 12 is shown deflected laterally and rotated, it is appreciated that the seal 12 may experience one of lateral deflection or rotation exclusively in the installed position or, alternatively, not experience any movement.

Figure 3:
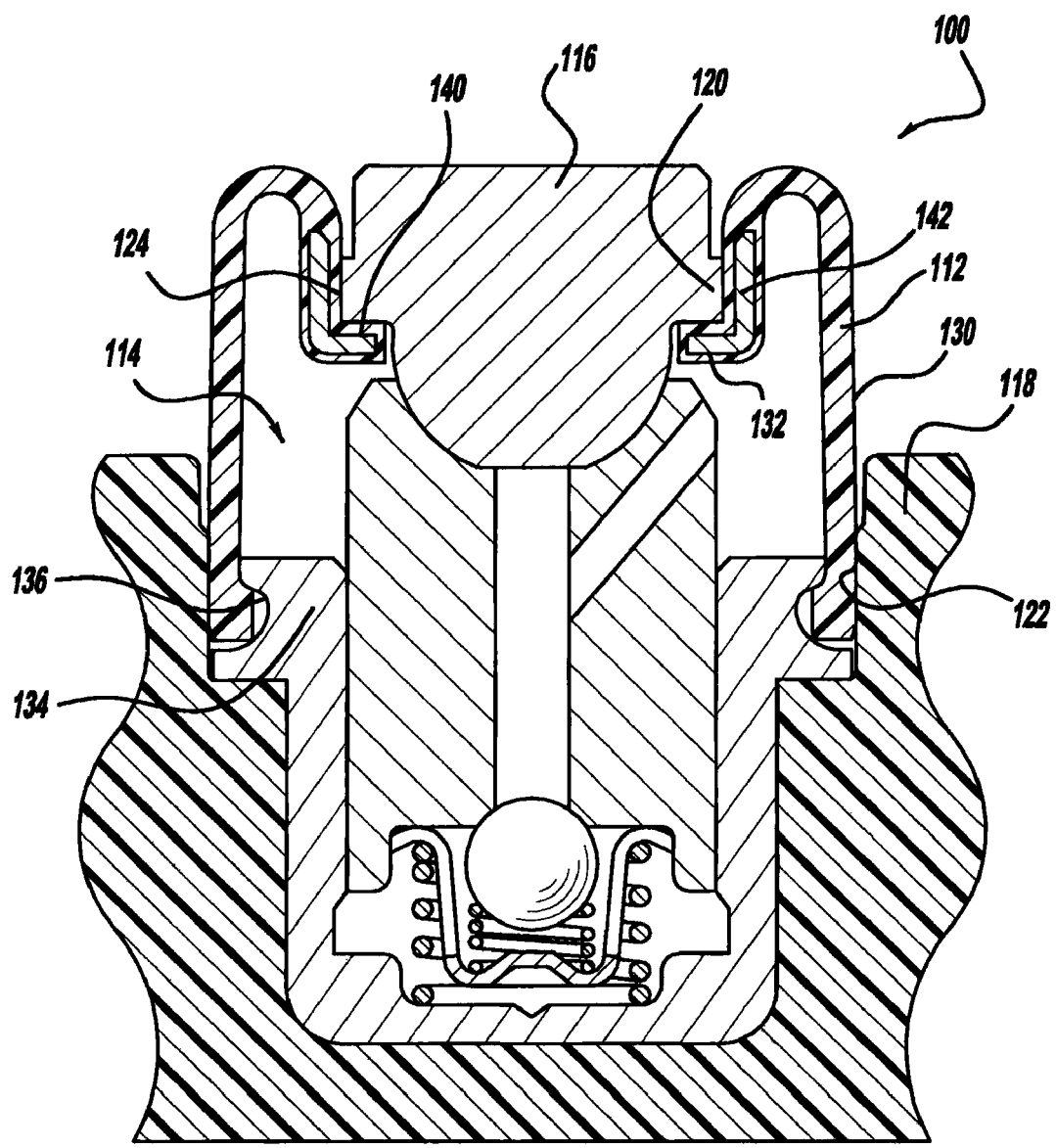
FIG. 3 is a sectional view of a seal constructed in accordance to additional features of the present disclosure.

With reference now to FIG. 3, an arrangement for sealing an annular space according to additional features is shown and generally identified at reference numeral 100. The arrangement 100 generally includes a seal 112 disposed in an annular space 114 defined between an inner member 116 and an outer member 118. The inner member 116 generally defines a collar 120. In operation, the seal 112 engages respective sealing surfaces 122 and 124 on the inner and outer members 116 and 118, respectively in an installed position. More specifically, a first portion 130 engages the sealing surface 122 and a second portion 132 engages the sealing surface 124. The first portion 130 is secured between the outer member 118 and an inner housing 134 having an annular groove 136.

The seal 112 includes an annular lip 140 for mating with the sealing surface 124 around a first end of the collar 120 of the inner member 116. The seal 112 may be made of an elastomeric material such as rubber. An annular ring 142 is arranged within the annular lip 140. The annular ring 142 may be made of a rigid material such as metal.

Figure 4:
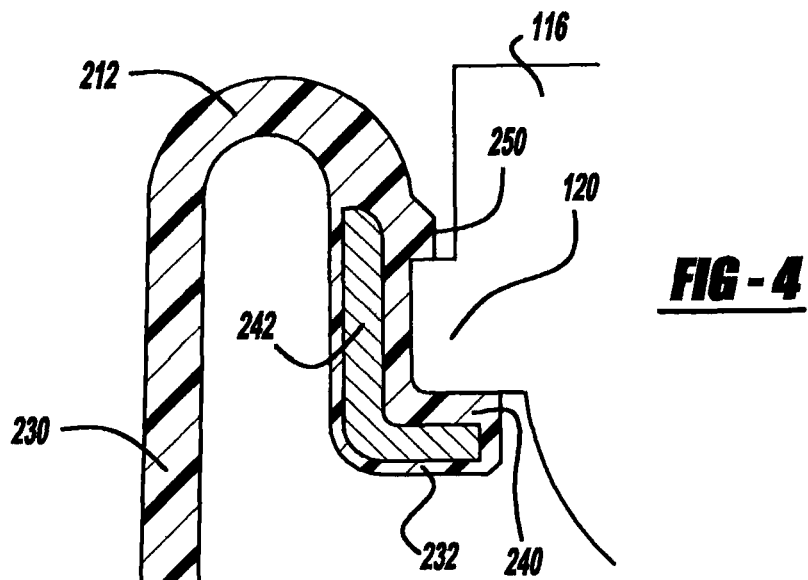
FIG. 4 is a detailed sectional view of a seal constructed in accordance to additional features of the present disclosure.

FIG. 4 is a cross-sectional view of a seal 212 according to additional features of the present disclosure. The seal 212 generally comprises the geometrical configuration of the seal 112 illustrated in FIG. 3 including a first portion 230, a second portion 232 and an annular ring 242. The seal 212 additionally includes a barb 250 arranged on a first end to complement an annular lip 240. In an installed position, the barb 250 and the annular lip 240 cooperate to capture the collar 120 in an installed position. In addition, an end of the first portion 230 of the seal 212 defines an annular foot portion 238 for nesting within the groove 136 defined on the inner housing 134.

Figure 5:
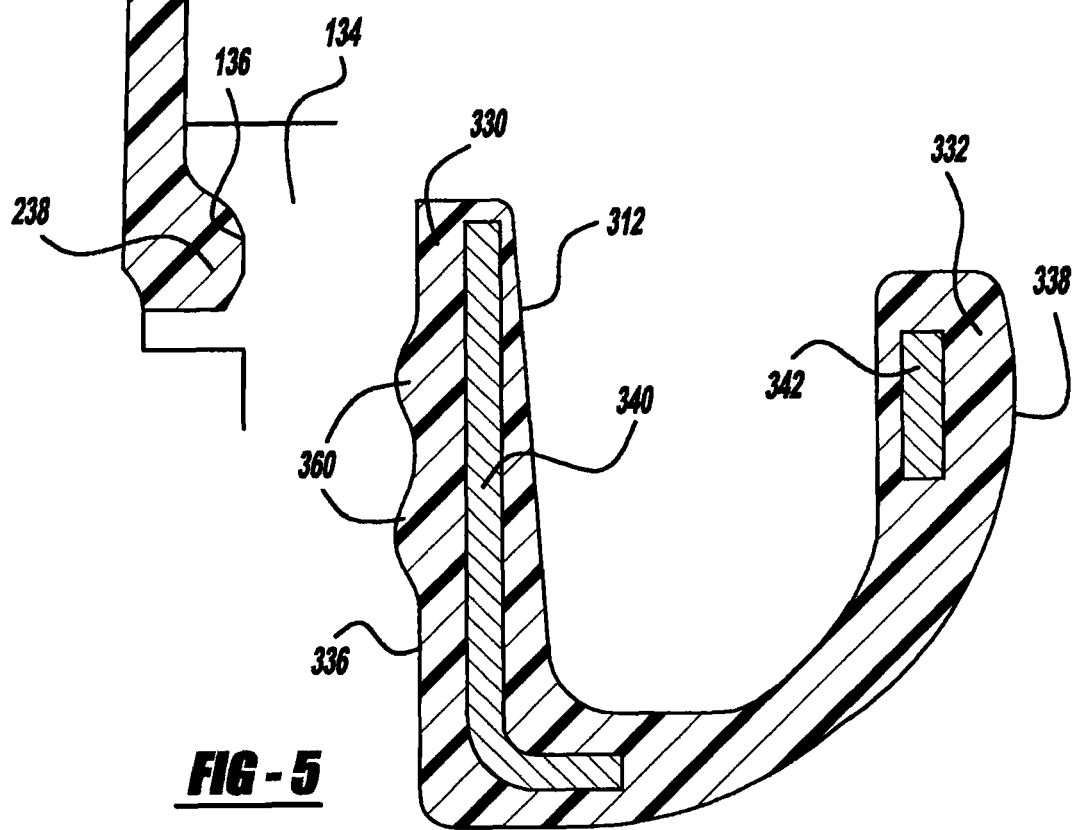
FIG. 5 is a detailed sectional view of a seal constructed in accordance to additional features of the present disclosure.
Figure 6:
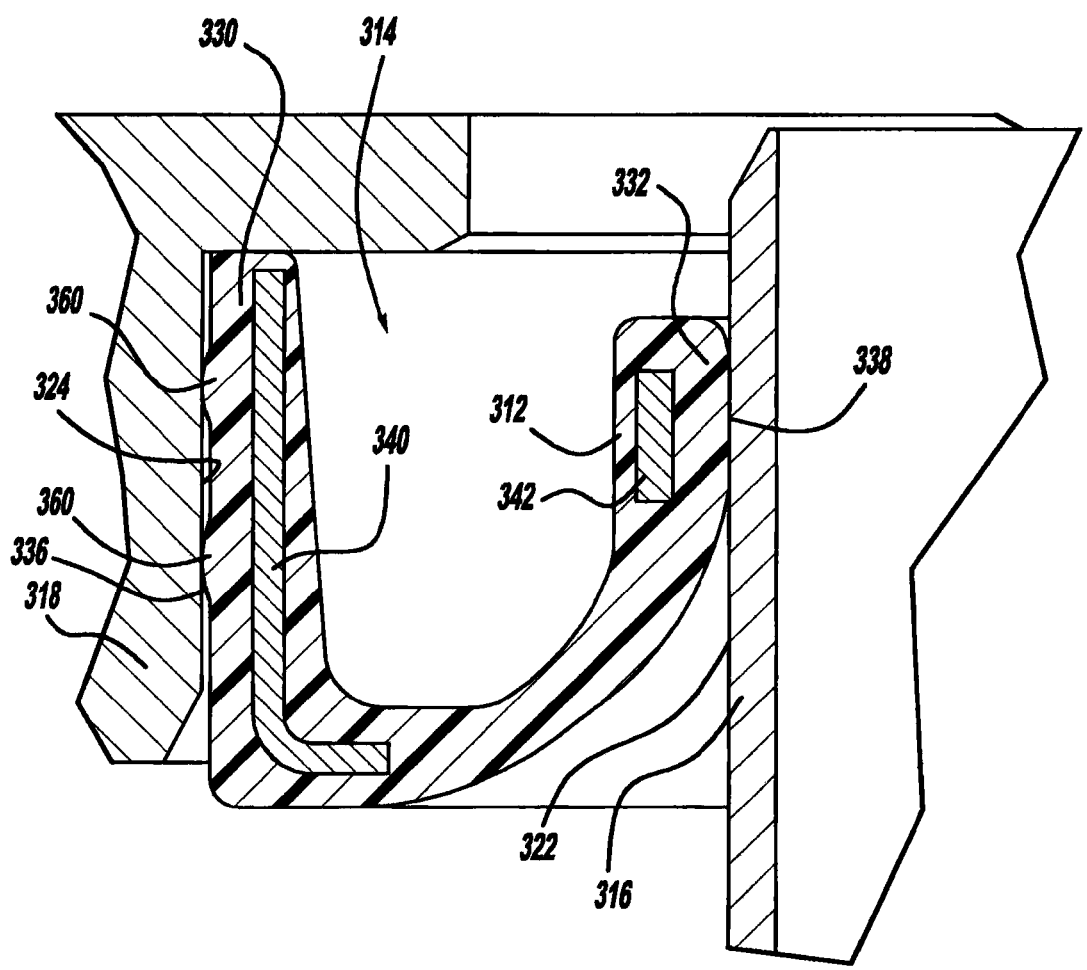
FIG. 6 is a sectional view of the seal of FIG. 5 shown in an installed position.

With reference now to FIGS. 5 and 6, a seal 312 according to additional features is shown. The seal 312 is adapted to form a seal between an annular space 314 defined between an inner member 316 and an outer member 318. The inner member 316 defines a sealing surface 322. The outer member 318 defines a sealing surface 324. The seal 312 generally comprises a first portion 330 having an outboard sealing surface 336 (FIG. 5) adapted to engage the sealing surface 324 of the outer member 318. The seal 312 further includes a second portion 332 having an inboard sealing surface 338 (FIG. 5) adapted to engage the sealing surface 322 of the inner member 316 in an installed position. Radial rings 340 and 342 are arranged in the first and second portions 330 and 332 respectively.

A pair of ribs 360 are arranged radially around the outboard sealing surface 336 of the first portion 330. The ribs 360 encourage a seal between the outboard sealing surface 336 of the seal 312 and the sealing surface 324 of the outer member 318. It is appreciated that additional or fewer ribs 360 may be arranged along the outboard sealing surface 336. It is further appreciated that ribs may be additionally provided at any location along the inboard and outboard sealing surfaces defined on any of the seals disclosed herein.

Figure 7:
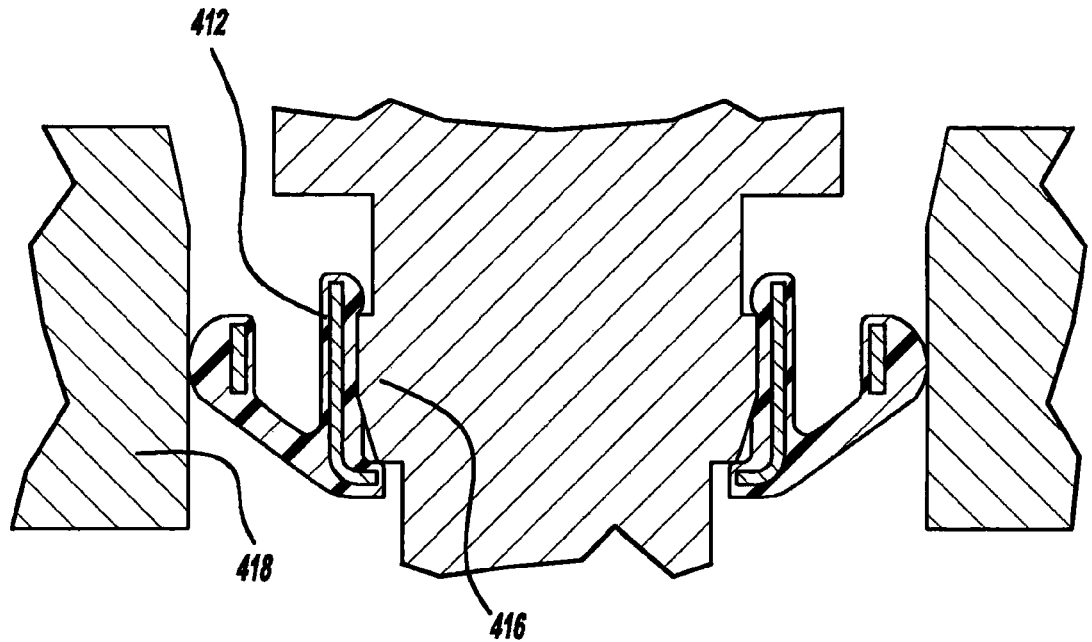
FIG. 7 is a sectional view of a seal constructed in accordance to additional features and shown in an installed position.

With reference now to FIG. 7, a seal 412 according to additional features is shown. The seal 412 is adapted to form a seal between an inner member 416 and an outer member 418. The seal 412 incorporates the barb-like retention properties including barb 420 and shoulder 422 as described herein at an interface with the inner member 416 to resist axial movement of the seal 412 relative to the inner member 416.

Figure 8:
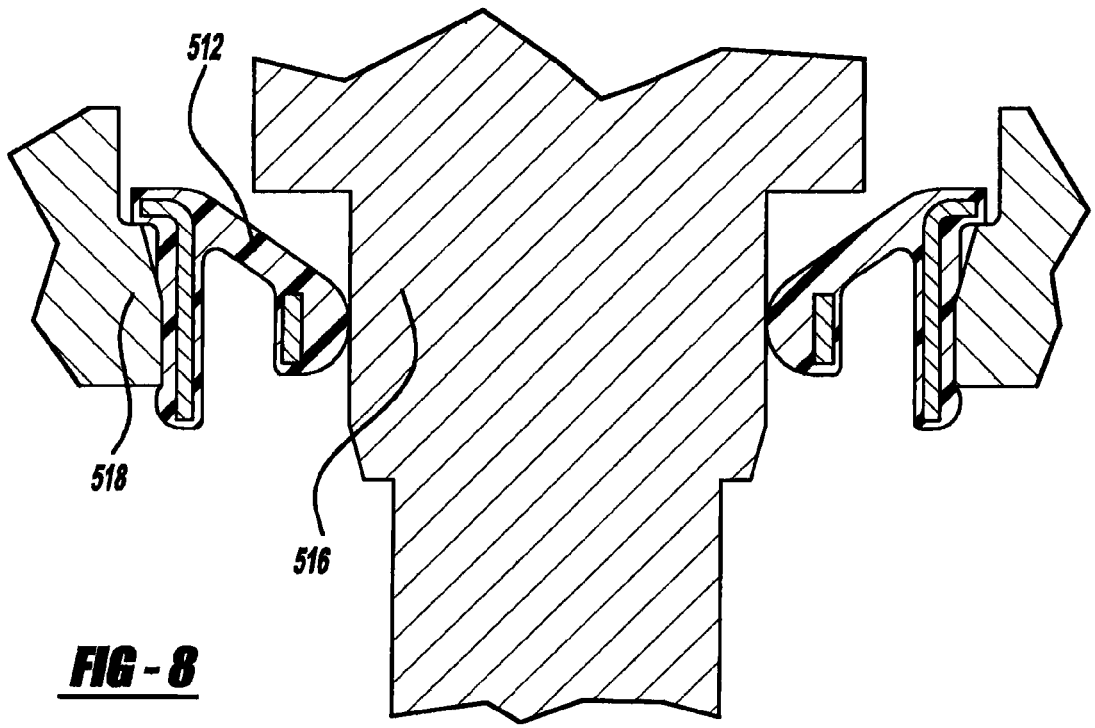
FIG. 8 is a sectional view of a seal constructed in accordance to additional features and shown in an installed position.

FIG. 8 illustrates a seal 512 according to additional features. The seal 512 is adapted to form a seal between an inner member 516 and an outer member 518. The seal 512 incorporates the barb-like retention properties including barb 520 and shoulder 522 as described herein at an interface with the outer member 518.

Figure 9:
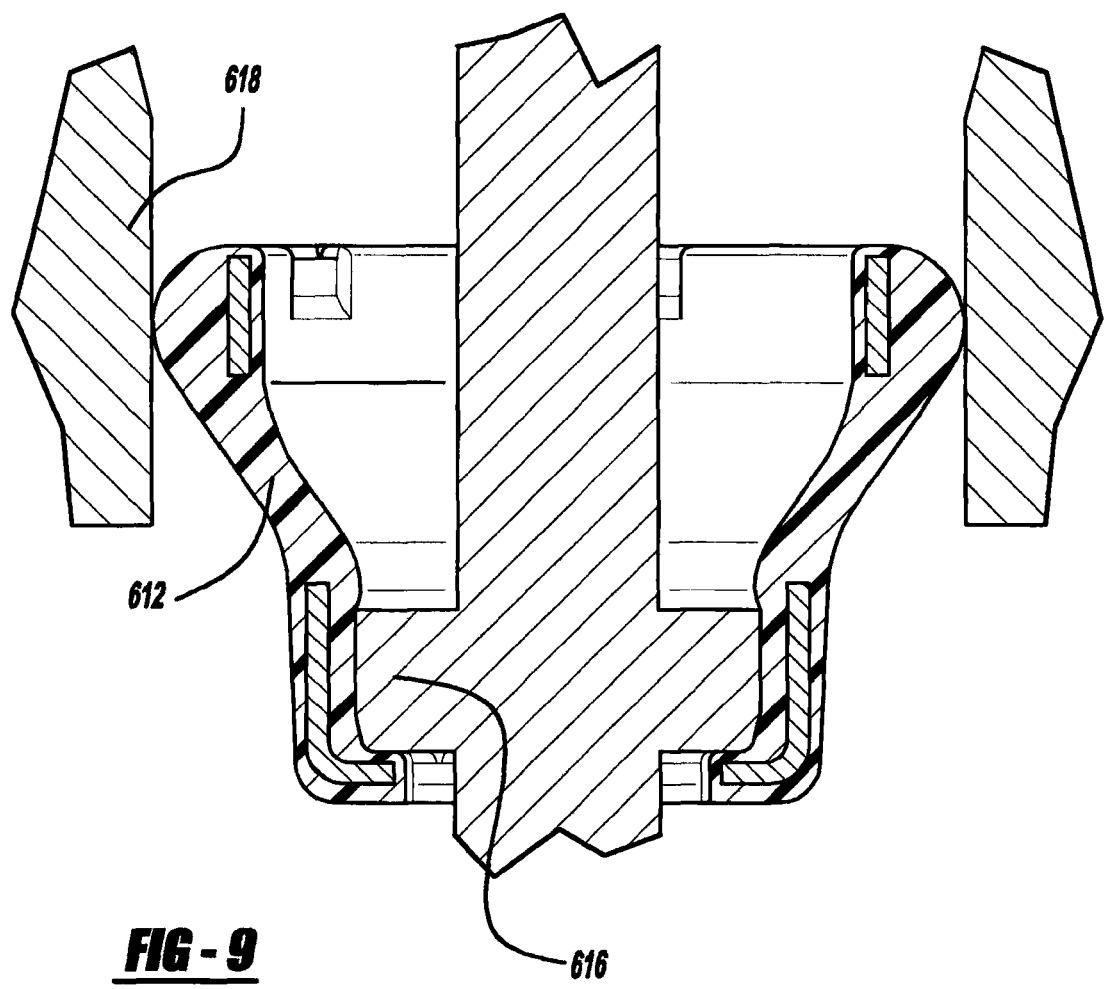
FIG. 9 is a sectional view of a seal constructed in accordance to additional features and shown in an installed position.

FIG. 9 illustrates a seal 612 according to additional features. The seal 612 is adapted to form a seal between an inner member 616 and an outer member 618. The seal 612 incorporates the barb-like retention properties as described herein at an interface with the inner member 616.

The seals 412 and 612 incorporate an annular lip arranged on an inner sealing surface for engaging the inner member 416 and 616 respectively. The annular lips of the seals 412 and 612 are similar to the annular lips 140 and 240 associated with seals 112 and 212 respectively. Seal 512 incorporates the annular lip on an outboard sealing surface for engaging the outer member 518.

Figure 10:
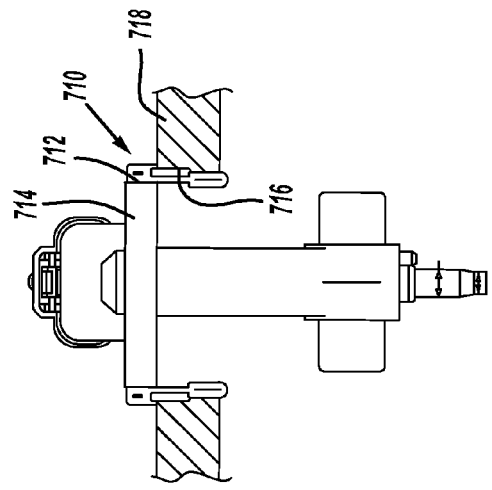
FIG. 10 is a partial cross-sectional view illustrating a tight package seal, according to the principles of the present disclosure, applied to a sensor received in a bore in a cover member.
Figure 11:
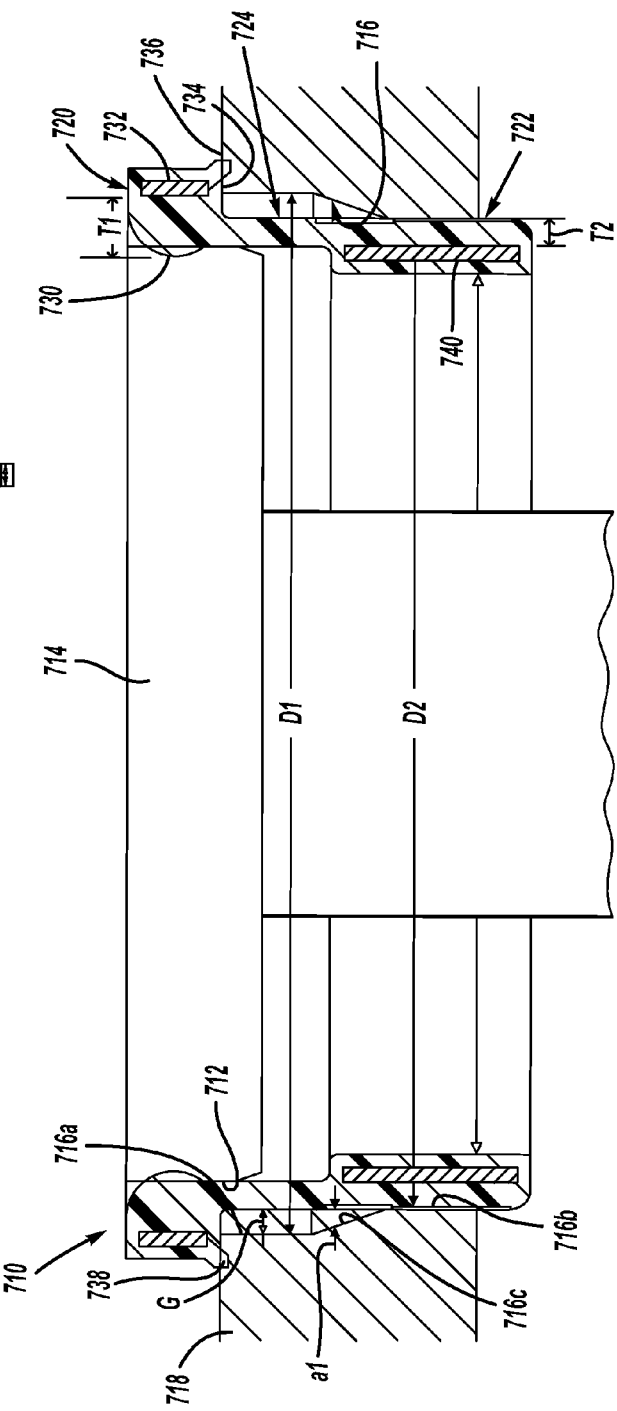
FIG. 11 is a detailed cross-sectional view of the tight package seal of FIG. 10.

With reference to FIGS. 10 and 11, a tight package seal 710 according to the present disclosure will now be described. In FIG. 10, the tight package seal 710 is provided in a sealing engagement between an outer surface 712 of a sensor body 714 and a bore 716 of a cover member 718. Although the seal 710 is described herein with reference to a specific embodiment as a sensor seal, it should be understood that the tight package seal 710 can be used in other applications for sealing between an outer surface of a first member and a bore of a second member wherein a limited radial space is provided therebetween.

With reference to FIG. 11, the tight package seal 710 includes an annular elastomeric seal body having a first seal portion 720 engaging the outer surface 712 of the sensor body 714. A second seal portion 22 is axially spaced from the first seal portion 720 and sealingly engages an inner surface of the bore 716 of the cover member 718. A flexible membrane portion 724 extends generally axially between the first seal portion 720 and the second seal portion 722.

The first seal portion 720 can include a radially inwardly extending raised bead portion 730 and can further include a reinforcing metal insert 732 embedded within the elastomeric material. The first seal portion 720 includes a radially outwardly extending stop surface 734 facing axially toward the second seal portion 722. The stop surface 734 engages a perimeter axial face 736 of the cover member 718. The stop surface 734 can include a dust lip 738 extending therefrom and axially engaging the face 736 of the cover member 718. A thickness T1 of the elastomeric material in the first seal portion 720 can be adjusted to allow for tighter or looser engagement with the outer surface 712 of the sensor body 714.

The bore 716 in the cover member 718 can include a first, outboard, portion 716a having a first diameter D1 and a second, inboard, portion 716b having a second diameter D2 which is smaller than D1. The first diameter D1 is larger than an outer diameter of the flexible membrane portion 724, so as to define a gap G between the flexible membrane portion 724 and the first portion 716a of the bore 716. An intermediate portion 716c of the bore 716 can define a tapered surface extending between the first portion 716a and the second portion 716b. The tapered surface can be provided with an angle a1. The angle a1 can be selected to allow lateral offset of the flexible membrane portion 724 relative to the first portion 716a of the bore 716. An angle a1 of between 10 and 30 degrees is preferred, although other angles can be used.

The second seal portion 722 has an outer diameter slightly larger than the diameter D2 of the second portion 716b of the bore 16 in order to provide a sealing engagement therebetween. The second seal portion can include a reinforcing metal insert 740 therein. A thickness T2 of the elastomeric material in the second seal portion 722 can be adjusted to allow for tighter or looser engagement with the inner surface 716b of the bore 716. Preferably, the thickness T2 is less than the thickness T1 to facilitate firmly holding the seal 710 within the bore 716 when the sensor body is inserted or removed.

The tight package seal 710 provides a sealed relationship between the sensor body 714 and the bore 716 wherein the sealed engagement with the sensor body 714 and the bore 716 are axially offset. The seal 710 also allows the sensor body 714 to be laterally offset relative to the bore 716 at least by the amount of the gap G between the flexible membrane portion 724 and the first portion 716a of the bore 716. The stop surface 734 and dust lip 738 of the first seal portion 720 provide a secondary seal engagement that is able to float radially to accommodate for lateral offset of the sensor body 714 relative to the bore 716.

Figure 12:
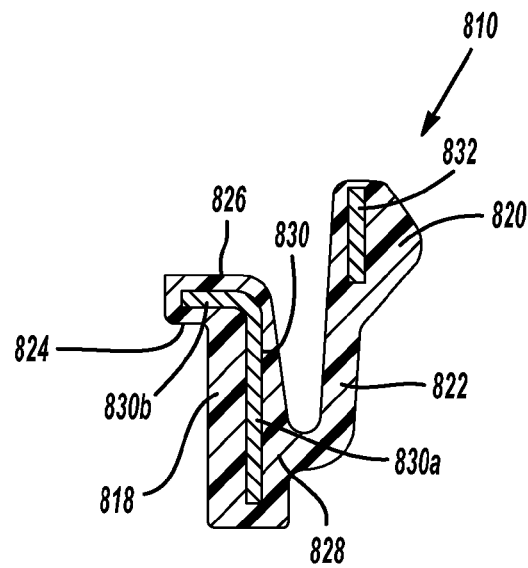
FIG. 12 is a sectional view of a hand assemblable seal according to the principles of the present disclosure.
Figure 13:
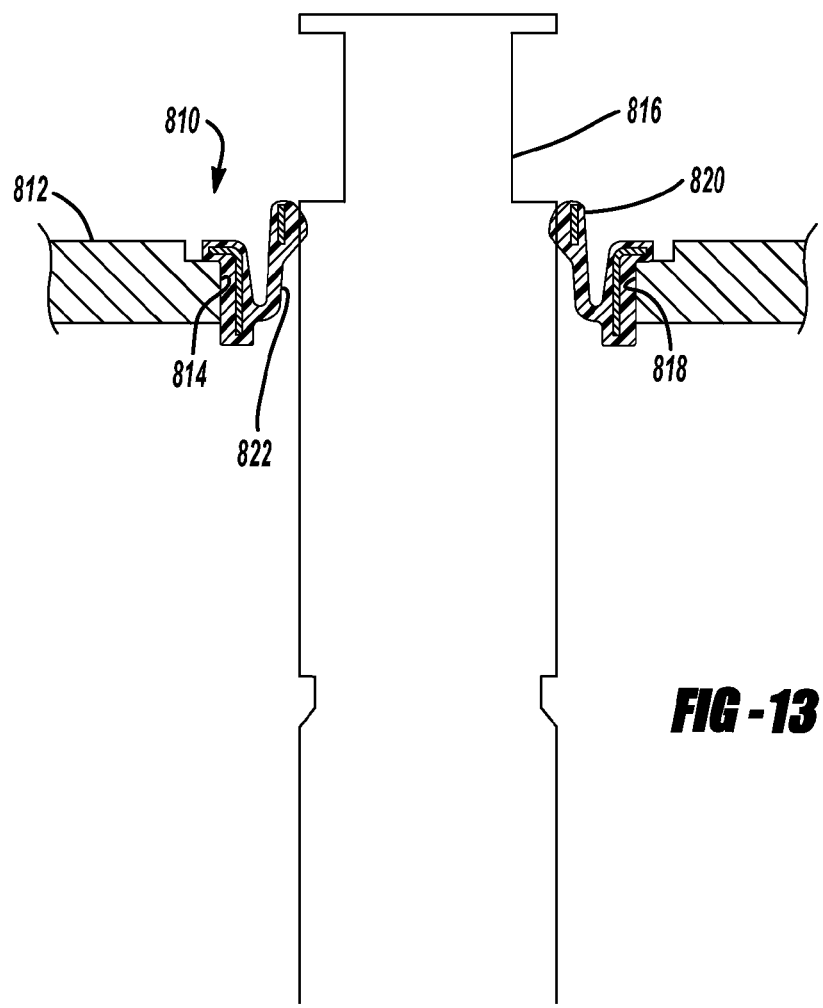
FIG. 13 is a cross-sectional view illustrating the assembly of the hand assemblable seal of FIG. 12.

With reference to FIGS. 12 and 13, a hand assemblable fuel injector seal 810 is shown for sealing between an outer member that can include a head of an engine 812 having an aperture 814 for receiving a fuel injector 816 which defines an inner member. The aperture 814 defines an outer sealing surface of the head 812 of the engine while the fuel injector 816 defines an inner sealing surface. The seal 810 is disposed between the outer member 812 and inner member 816 and includes first and second portions including an outer seal portion 818 adapted to sealingly engage with the outer sealing surface of the head 812 in an installed position, and an inner seal portion 820 adapted to sealingly engage the seal surface of the fuel injector 816. A flexible intermediate portion 822 extends between the outer and inner seal portions 818, 820. The flexible intermediate portion 822 extends both radially inwardly and axially from the outer seal portion 818. The outer seal portion 818 of the seal includes a radially outwardly extending shoulder portion 824 disposed at a first outboard end 826 of the outer seal portion 818. The flexible intermediate portion 822 extends from the outer seal portion 818 at a location 828 that is axially spaced from the first outboard end 826 of the outer seal portion 818. The flexible intermediate portion 822 extends axially from the first location 828 to a second location toward said first end 826 of said outer seal portion 818.

The outer seal portion 818 includes an annular ring 830 disposed in the outer seal portion 818. The annular ring 830 includes an axially extending portion 830a and a radially outwardly extending portion 830b extending from an end of the axially extending portion 830a. The radially extending portion 830b is disposed in and reinforces the radially extending shoulder portion 824 in an axial direction. The inner seal portion 820 includes a second annular ring 832 disposed therein. The first and second annular rings 830, 832 reinforce the outer and inner seal portions 818, 820. During assembly, the inner seal portion 820 of the seal 810 is assembled to the fuel injector 816 and the fuel injector 816 is then inserted into the aperture 814 of the head 812. The outer portion 818 of the seal 810 is then pressed by hand into the aperture 814 until the shoulder portion 824 abuts against the outer edge of the aperture 814.

Figure 14:
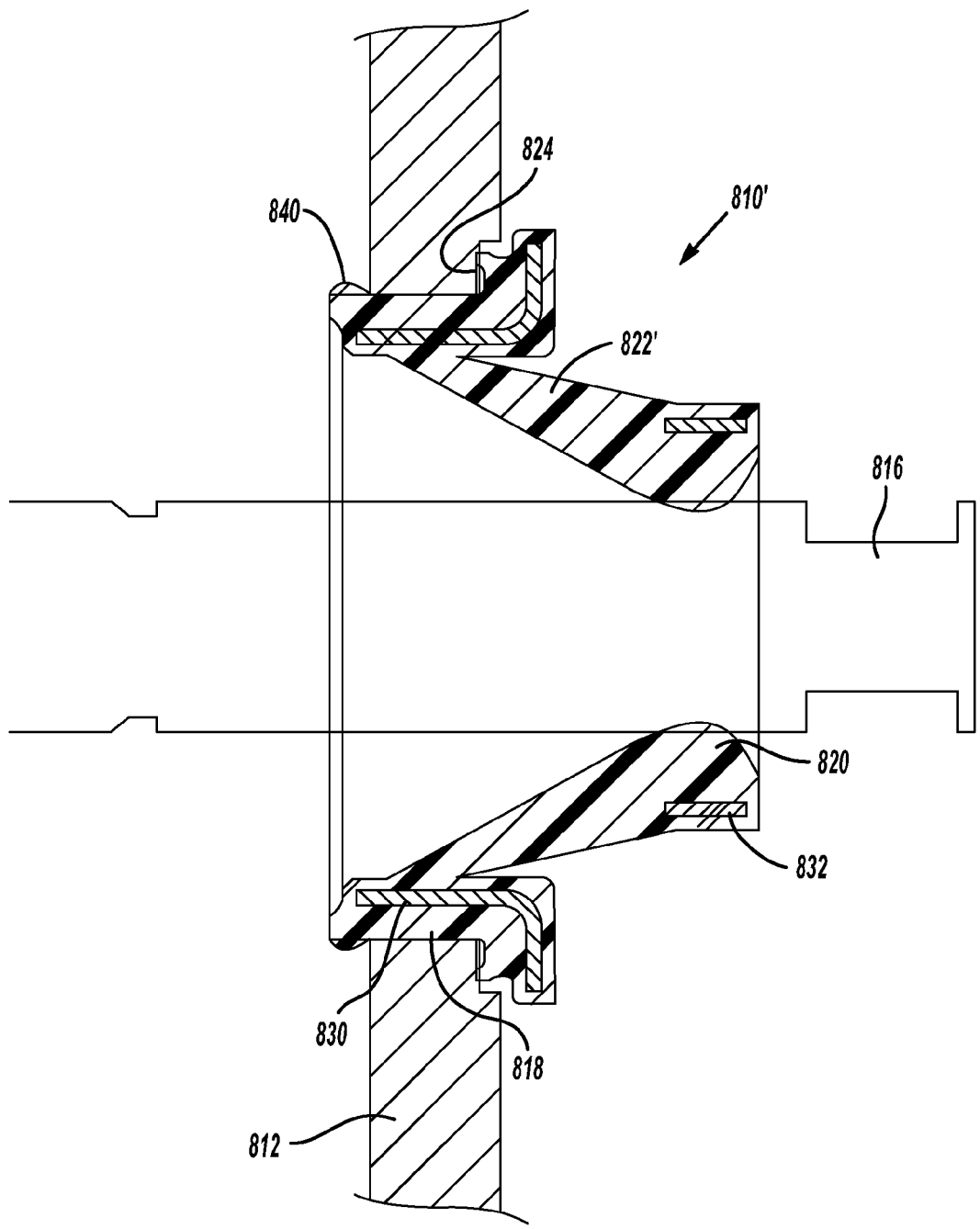
FIG. 14 is a sectional view of a further hand assemblable seal according to the principles of the present disclosure.

In an alternative arrangement of the seal 810', as illustrated in FIG. 14, in which the same reference numerals are used to indicate the same or similar features, a second end of the outer seal portion 818 can be provided with a retaining rib 840 that can act as a barb in engaging an inner edge of the aperture 814 for assisting in retaining the outer seal portion 818 in place. In the embodiment shown in FIG. 14, the intermediate portion 822' is configured to have a generally conical inner and outer surface.

What is claimed is:
1. A seal arrangement comprising:
an outer member defining an outer sealing surface that faces radially inwardly;
an inner member offset radially inward from said outer member and defining an inner sealing surface that faces radially outwardly; and a seal interposed between said inner and outer member in an installed position and comprising:
  a first sealing portion having a first and a second sealing surface, wherein said first sealing surface faces radially outwardly and sealingly engages said outer sealing surface of said outer member in said installed position at a first axial location;
  a first annular ring disposed in said first sealing portion;
  a second sealing portion having a third sealing surface that faces radially inwardly and sealingly engages said inner member in said installed position;
  a second annular ring disposed in said second sealing portion; and
  a flexible intermediate portion extending between said first and second sealing portions;
wherein said outer member defines a first radial edge adjacent said outer sealing surface and wherein an outboard end of said first sealing portion of said seal includes a first overlap shoulder portion extending around said first radial edge outwardly beyond an inner diameter of said outer sealing surface, said first overlap shoulder portion comprising said second sealing surface that is adapted to sealingly engage said first radial edge, said first sealing portion comprising a second overlap portion extending outwardly beyond said inner diameter of said outer sealing surface, said second sealing portion located at a second axial position, said first overlap portion located axially between said first and second axial locations.

2. The seal arrangement of claim 1, wherein said first and second annular ring comprise metallic material.

3. The seal arrangement of claim 1, wherein said first and second sealing surfaces of said first sealing portion of said seal and an inner surface of said second sealing portion of said seal comprise an elastomeric material.

4. The seal arrangement of claim 1 wherein said second sealing surface extends along a plane that intersects said first sealing surface.

5. The seal arrangement of claim 4 wherein said first and third sealing surfaces extend along non-intersecting lines taken through an axial cross-section of said seal.

6. The seal arrangement of claim 4 wherein said second sealing surface extends along a plane that is transverse to said first sealing surface.

7. The seal arrangement of claim 1 wherein said third sealing surface sealingly engages said inner member exclusively along a diametrically opposed engaging surface of said third sealing surface.

8. A seal arrangement comprising:
  an outer member defining an outer sealing surface that faces radially inwardly;
  an inner member offset radially inward from said outer member and defining an inner sealing surface that faces radially outwardly; and
  a seal adapted to be moved from an uninstalled position to an installed position interposed between said inner and outer member, said seal comprising:
    a sealing portion having a first, second and third sealing surface, wherein said first sealing surface faces radially outwardly and sealingly engages said outer sealing surface of said outer member at a first axial location, said second sealing surface extends along a first plane that intersects said first sealing surface and is adapted to sealingly engage said outer member in said installed position, said third sealing surface faces radially inwardly and sealingly engages said inner sealing surface of said inner member in said installed position;
    wherein said outer member defines a first radial edge adjacent said outer sealing surface and wherein said second sealing surface is disposed on an outboard end of said seal forming an overlap shoulder portion extending around said first radial edge outwardly beyond an inner diameter of said outer sealing surface, said first sealing surface further comprising a second overlap portion that is configured to extend around a second radial edge of said outer member beyond said inner diameter of said outer sealing surface, wherein said seal includes a flexible intermediate portion extending axially between said first sealing surface and said third sealing surface, said third sealing surface located at a second axial location axially spaced from said first axial location, said second sealing surface located axially between said first and second axial locations.

9. The seal arrangement of claim 8, further comprising a first annular ring disposed in said seal, said first annular ring having an axially extending portion that is generally parallel to said first sealing surface and a radially outwardly extending portion that is generally parallel to said second sealing surface.

10. The seal arrangement of claim 9, further comprising a second annular ring disposed in said seal, said second annular ring located radially inwardly relative to said first annular ring.

11. The seal arrangement of claim 10 wherein said first and second annular rings comprise metallic material.

12. The seal arrangement of claim 10 wherein said first, second and third sealing surfaces of said seal comprise an elastomeric material.

13. The seal arrangement of claim 8 wherein said first and third sealing surfaces extend along non-intersecting lines taken through an axial cross-section of said seal in said uninstalled position.

14. The seal arrangement of claim 8 wherein said second overlap portion has an arcuate cross-section and wherein said outer sealing surface and said second radial edge of said outer member are perpendicular relative to each other.

15. The seal arrangement of claim 8 wherein said second sealing surface extends along a plane that is transverse to said first sealing surface.

16. The seal arrangement of claim 8 wherein said third sealing surface sealingly engages said inner member exclusively along a diametrically opposed location.

17. The seal arrangement of claim 8 wherein said first and second radial edges of said outer member are parallel.

18. A seal arrangement comprising:
  an outer member having first and second radial edges and an outer sealing surface that faces radially inwardly;
  an inner member offset radially inward from said outer member and defining an inner sealing surface that faces radially outwardly; and
  a seal interposed between said inner and outer member in an installed position and comprising:
    a first sealing portion having a first sealing surface, a second sealing surface and a retaining rib, wherein said first sealing surface faces radially outwardly and sealingly engages said outer sealing surface of said outer member at a first axial location and wherein said second sealing surface includes a dust lip having a dust lip sealing surface that extends along a plane that intersects said first sealing surface in an uninstalled position and extends outwardly beyond an inner diameter of said outer sealing surface and sealingly engages said first radial edge of said outer member in said installed position;

a first annular ring disposed in said first sealing portion;

a second sealing portion having a third sealing surface that faces radially inwardly and is adapted to sealingly engage said inner sealing surface of said inner member at a second axial location axially spaced from said first axial location in said installed position, said first and third sealing surfaces extending along non-intersecting lines taken through an axial cross-section of said seal in said uninstalled position;

a second annular ring disposed in said second sealing portion; and a flexible intermediate portion axially extending between said first and second sealing portions;

wherein said second sealing surface is disposed on an outboard end of said first sealing portion of said seal and wherein said dust lip is configured to extend around said first radial edge outwardly beyond an inner diameter of said inner sealing surface and wherein said retaining rib is adapted to locate against said second radial edge in said installed position, said dust lip being disposed axially between said first and second axial locations.

19. The seal arrangement of claim 18 wherein said second sealing surface extends along a plane that is transverse to said first sealing surface.

20. The seal arrangement of claim 18 wherein said third sealing surface sealingly engages said inner member exclusively along a diametrically opposed engaging surface of said third sealing surface.

* * * * *